United States Patent
Dench et al.

(10) Patent No.: US 11,761,232 B2
(45) Date of Patent: Sep. 19, 2023

(54) ADJUSTABLE FENCE POST COUPLER

(71) Applicants: David Dench, Midland, TX (US);
Trisha Dench, Midland, TX (US)

(72) Inventors: David Dench, Midland, TX (US);
Trisha Dench, Midland, TX (US)

( * ) Notice: Subject to any disclaimer, the term of this patent is extended or adjusted under 35 U.S.C. 154(b) by 459 days.

(21) Appl. No.: 17/010,978

(22) Filed: Sep. 3, 2020

(65) Prior Publication Data

US 2021/0062536 A1 Mar. 4, 2021

Related U.S. Application Data

(60) Provisional application No. 62/895,098, filed on Sep. 3, 2019.

(51) Int. Cl.
*E04H 17/16* (2006.01)
*F16B 2/08* (2006.01)

(52) U.S. Cl.
CPC .............. *E04H 17/166* (2013.01); *F16B 2/08* (2013.01)

(58) Field of Classification Search
CPC .............. E04H 17/1447; E04H 17/146; E04H 17/1473; E04H 17/1488; E04H 17/17; E04H 17/23; F16B 2/06; F16B 2/08
See application file for complete search history.

(56) References Cited

U.S. PATENT DOCUMENTS

| | | | | |
|---|---|---|---|---|
| 1,341,113 A * | 5/1920 | Dottl | ..................... | F16L 3/24 248/300 |
| 2,835,002 A * | 5/1958 | Majewski | ................. | E04G 7/18 403/400 |
| 4,460,142 A * | 7/1984 | O'Rorke | ................... | G09F 7/18 248/230.8 |
| 4,471,947 A * | 9/1984 | Osborne | ............... | E04H 17/143 256/69 |
| 4,899,991 A * | 2/1990 | Brunkan | ............... | E04H 17/143 256/65.06 |
| 5,277,408 A * | 1/1994 | Parker | ..................... | E04H 17/16 256/60 |
| 5,297,890 A * | 3/1994 | Commins | ................. | F16L 3/12 403/384 |
| 5,593,143 A | 1/1997 | Ferrarin | | |
| 6,802,496 B1 | 10/2004 | Preta | | |
| 8,109,006 B2 | 2/2012 | Knudsen | | |
| 8,220,781 B2 * | 7/2012 | Gray | ................... | E04H 17/1447 256/65.13 |

(Continued)

*Primary Examiner* — Jonathan P Masinick
(74) *Attorney, Agent, or Firm* — Boudwin Intellectual Property; Daniel Boudwin

(57) ABSTRACT

An adjustable fence post coupler is shown and described. The adjustable fence post coupler includes a fence connection plate. The fence connection plate has a plurality of apertures located through the plate. The apertures are configured to allow for fasteners to be placed though and into the fence securing the fence connection plate to the fence. The fence connection plate is connected to at least two connection bolts. The connection bolts are connected to a fence post coupler strap. The connection strap has at least two tubes attached to the connection strap. The connection bolts go through the tubes securing them to the fence post coupler strap. The fence post coupler strap is connected to a fence post. The adjustable fence post coupler is used to adjust the distance from the fence post that the fence is installed at. This allows for a perfectly linear fence.

8 Claims, 5 Drawing Sheets

(56) References Cited

U.S. PATENT DOCUMENTS

| | | | |
|---|---|---|---|
| 8,631,551 B1* | 1/2014 | Payne | E04H 17/1447 |
| | | | 256/65.11 |
| 8,834,057 B2* | 9/2014 | Adams, Jr. | F16B 7/0493 |
| | | | 403/233 |
| 8,919,742 B2 | 12/2014 | Williams et al. | |
| 9,115,506 B2* | 8/2015 | Hill | E04H 17/1417 |
| 9,512,633 B2 | 12/2016 | Marron | |
| 10,428,849 B2* | 10/2019 | Hill | E04H 17/1473 |
| 10,687,430 B2* | 6/2020 | Lajux | H02G 3/12 |
| 11,346,467 B2* | 5/2022 | Weber | F16B 2/20 |
| 2015/0123061 A1 | 5/2015 | Walters | |

* cited by examiner

ADJUSTABLE FENCE POST COUPLER

CROSS REFERENCE TO RELATED APPLICATIONS

This application claims the benefit of U.S. Provisional Application No. 62/895,098 filed on Sep. 3, 2019. The above identified patent application is herein incorporated by reference in its entirety to provide continuity of disclosure.

BACKGROUND OF THE INVENTION

The present invention relates to an adjustable fence post coupler. More particularly, the present invention provides a device that can move a fence to create a uniform parallel fence.

Fences are becoming more and more popular as homes become closer and closer together. A popular fence type is a privacy fence. These fences create a solid wall. With a solid wall fence it can be obvious if the fence is not completely upright. This can create and unappealing look to the fence. Unfortunately, currently due to the installation process fences may not always be installed completely upright.

Installing a fence is a two part process and can be delicate at times. The first part of installing a fence is to set fence posts. When installing fence posts a hole must be dug then the fence post is leveled within the hole. After this leveling the hole is filled in with fill or a concrete. During the fill process or as concrete sets it can be an impossible task to keep the fence post perfectly level and upright.

The second step in the process is to install and attach the fence to the fence post. The current process is to simply connect the fence directly to the fence post. This process will not correct any tilting of the fence post. A current solution is to attach the fence post using shims. This creates several issues. First, shims will require more than one person to install the fence. Second, even using shims is not exact and may not correct the tilting of the fence post.

Consequently, there is a need in for an improvement in the art of putting up a fence. The present invention substantially diverges in design elements from the known art while at the same time solves a problem many people face when installing a fence. In this regard the present invention substantially fulfills these needs.

SUMMARY OF THE INVENTION

The present invention provides an adjustable fence post coupler wherein the same can be utilized for providing convenience for the user when installing a fence. The adjustable fence post coupler is comprised of a fence post coupler strap. At least one tube is connected to an exterior of the fence post coupler strap. The tube is connected to the fence post coupler strap with a swivel attachment. Each tube has a connection bolt that goes through the tube. The connection bolt is connected to a fence connection plate.

Another object of the adjustable fence post coupler is to have the fence post coupler strap be a solid, flexible strap.

Another object of the adjustable fence post coupler is to have the fence post coupler strap be circular.

Another object of the adjustable fence post coupler is to have the fence post coupler strap be rectangular.

Another object of the adjustable fence post coupler is to have at least one nut located on each connection bolt.

Another object of the adjustable fence post coupler is to have a threaded connection on the fence connection plate, wherein the connection bolts are connected to the fence connection plate via the threaded connection.

Another object of the adjustable fence post coupler is to have a tightening bolt configured to tighten the fence post coupler strap.

Another object of the adjustable fence post coupler is to have each tube have a pin located on an exterior side thereof, and the fence post coupler strap will have at least two apertures located therethrough that the pins are movably secured into.

Other objects, features and advantages of the present invention will become apparent from the following detailed description taken in conjunction with the accompanying drawings.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
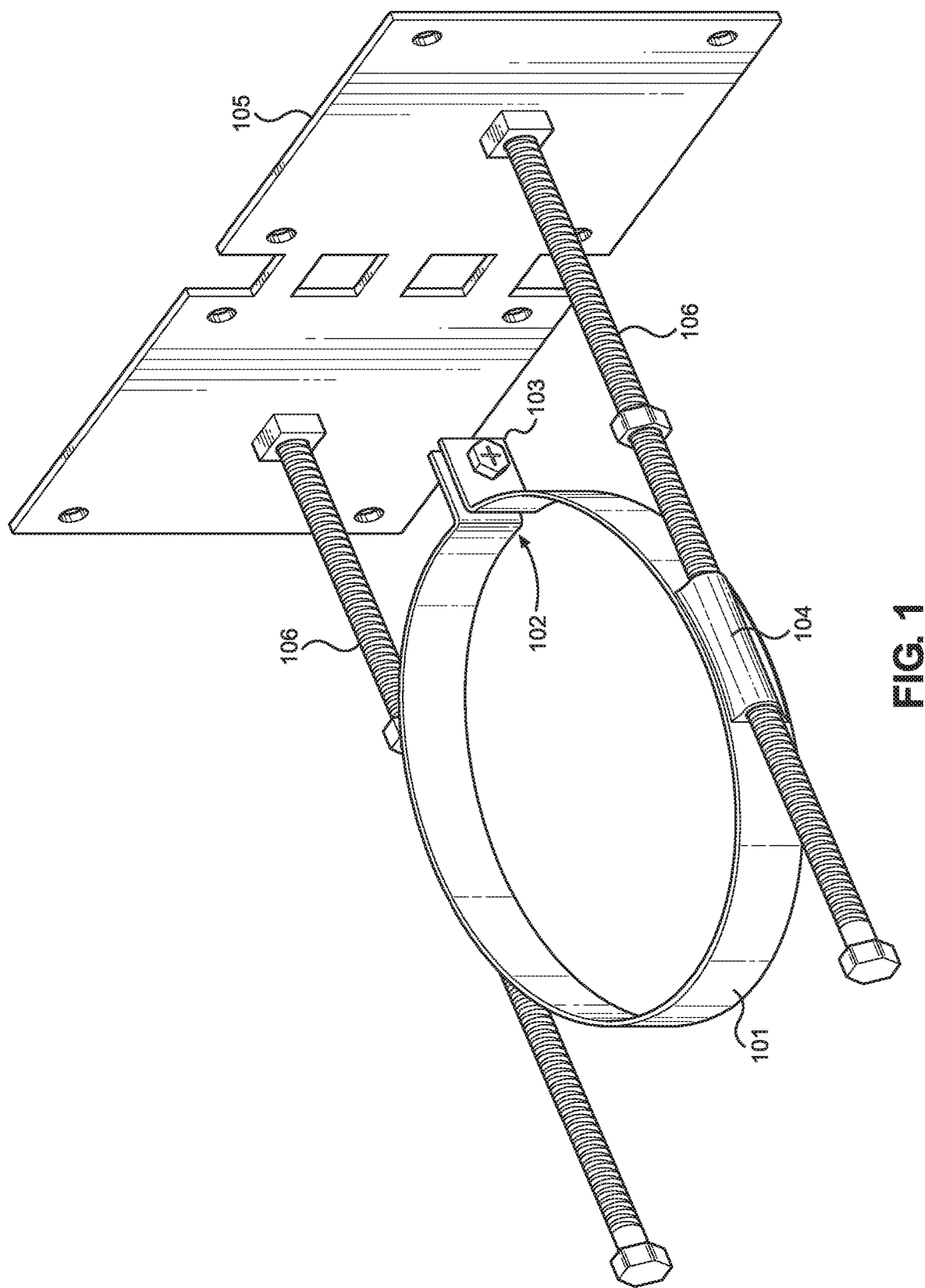
FIG. 1 shows a perspective view of an embodiment of an adjustable fence post coupler.

Reference is made herein to the attached drawings. Like reference numerals are used throughout the drawings to depict like or similar elements of the adjustable fence post coupler. For the purposes of presenting a brief and clear description of the present invention, a preferred embodiment will be discussed as used for the adjustable fence post coupler. The figures are intended for representative purposes only and should not be considered to be limiting in any respect.

Referring now to FIG. 1, there is shown a perspective view of an embodiment of an adjustable fence post coupler. The adjustable fence post coupler includes a fence post coupler strap 101. The fence post coupler strap 101 is configured to fit securely around a fence post. In one embodiment the fence post coupler strap 101 is made from metal. In another embodiment the fence post coupler strap 101 is made from wood. In a third embodiment the fence post coupler strap 101 is made from a fabric material.

In one embodiment the fence post coupler strap 101 has an opening 102 along the perimeter thereof. This opening 102 will allow the fence post coupler strap to be pulled open and placed around a fence post. This will eliminate the need for the fence post coupler strap to be slid over a fence post. In one embodiment there is a further securement device 103 located one either side of the opening 102. This securement device will allow the fence post coupler strap 101 to be tightened around a fence post. See a further description of the securement device in in the description of FIG. 3.

The adjustable fence post coupler is further comprised of a plurality tubes 104. The plurality of tubes 104 have apertures longitudinally therethrough. In one embodiment the apertures are threaded. The plurality of tubes 104 are secured to the fence post coupler strap 101. In one embodiment the plurality of tubes 104 are secured to an outside perimeter of the fence post coupler strap 101. See a description of further embodiments in the description of FIG. 3.

The adjustable fence post coupler has a fence connection plate 105. See a further description of the fence connection plate in FIG. 4. The fence connection plate 105 is connected to the fence post securement strap via a connection bolt 106. A connection bolt 106 will be placed through each of the plurality of tubes 104. Each bolt will be then attached to the fence connection plate 105. See a further description for this attachment and the connection bolt 106 in FIG. 3.

Figure 2:
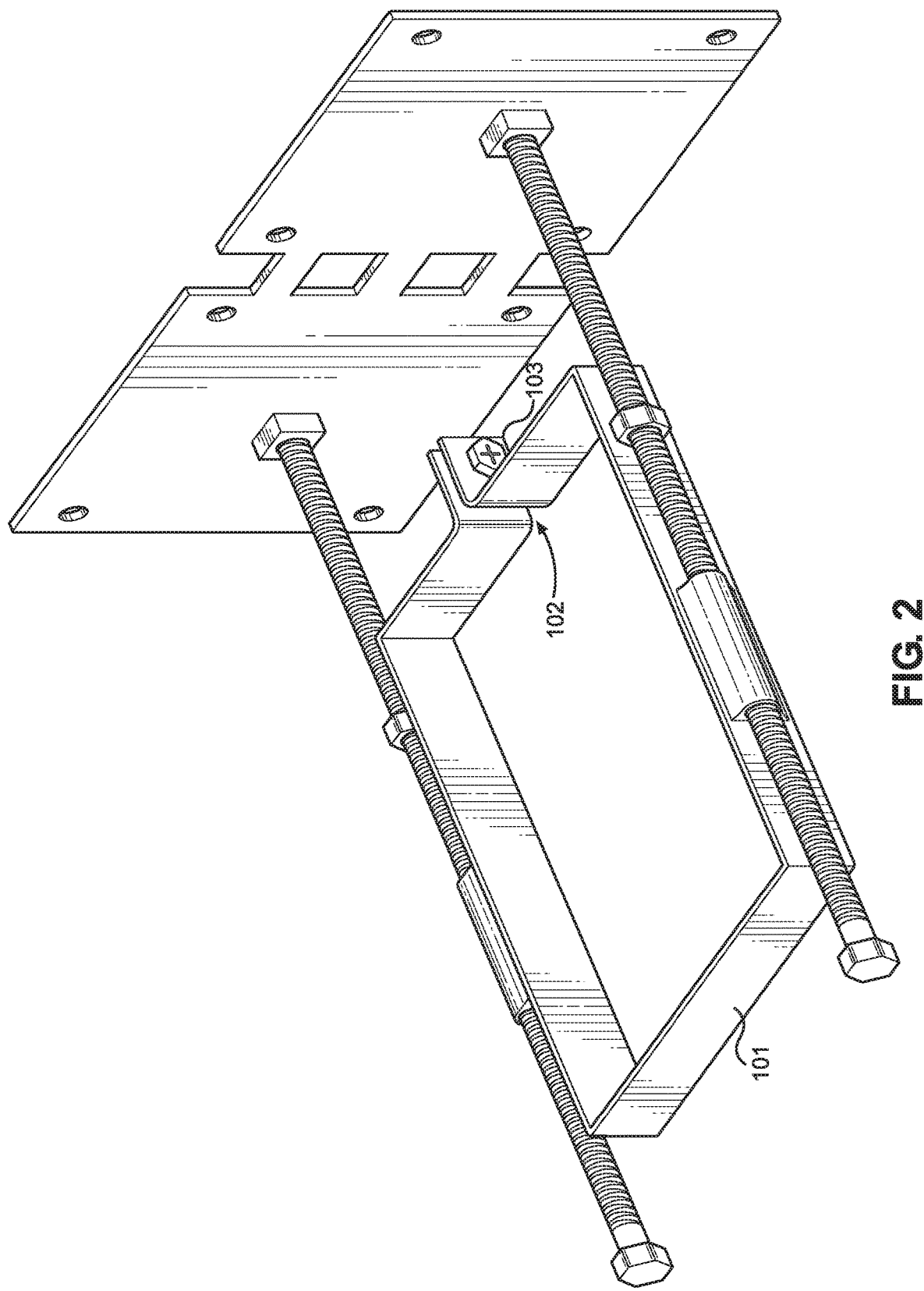
FIG. 2 shows a perspective view of an alternative embodiment of an adjustable fence post coupler.

Referring now to FIG. 2, there is shown a perspective view of an alternative embodiment of an adjustable fence post coupler. In an alternative embodiment the fence post coupler strap 101 is configured to have a rectangular shape. This will allow the fence post coupler strap 101 to fit around a rectangular fence post. In this embodiment the strap has at least one opening 102 along the perimeter thereof. This will allow the fence post coupler strap 101 to be opened and placed around a fence post. In one embodiment there is a further securement device 103 located one either side of the opening 102. This securement device will allow the fence post coupler strap 101 to be tightened around a fence post. See a further description of the securement device in in the description of FIG. 3.

Figure 3:
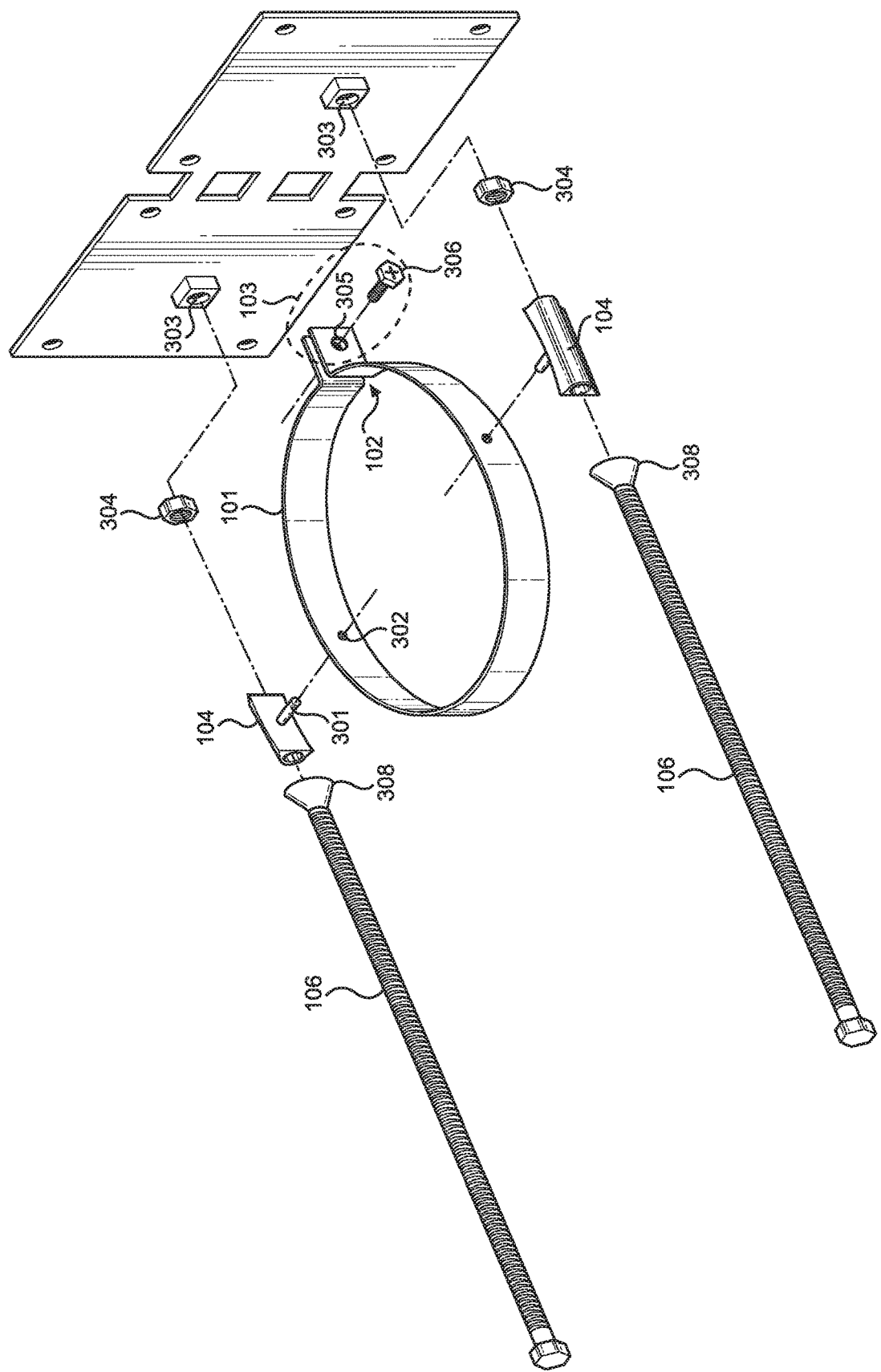
FIG. 3 shows a partially exploded view of an embodiment of the adjustable fence post coupler.

Referring now to FIG. 3, there is shown a partially exploded view of an embodiment of the adjustable fence post coupler. In one embodiment the securement device 103 of the fence post securement strap 101 is comprised of a threaded aperture 305 located on each side of the opening 102. The securement device 103 is further comprised of a securement bolt 306. The securement bolt 306 is configured to fit within the threaded aperture 305. When the bolt is tightened into the threaded aperture 305 the fence post securement strap 101 will tighten around a fence post.

In one embodiment the plurality of tubes 104 are swivally connected to the fence post securement strap 101. In this embodiment the tubes 104 have a pin 301 located on an exterior side thereof. The fence post securement strap 101 further has an aperture 302 for each tube 104. The aperture will be proportioned to accept the pin 301 therein. This will allow the tube to swivel. This will keep the fence post coupler strap 101 and the fence connection plate 105 firmly attached to their respective fence parts.

In one embodiment the connection bolts 106 are connected to the fence connection plate 106 via an aperture 303. In one embodiment the aperture 303 is threaded. In one embodiment the threaded aperture 303 will allow the connection bolt 106 to screw into the fence. In another embodiment the threaded aperture 303 will only allow the connection bold 106 to screw into the threaded aperture 303 until pressed against the fence connection plate 105.

In another embodiment the aperture 303 leads to an opened area. The opened area is configured to hold the bolt 106. In this embodiment the end of the bolt 106 has a widened section 108. In one embodiment the widened section 108 will allow the bolt 106 to spin freely. In a further embodiment the bolt 106 will be able to tilt.

In some embodiments the connection bolt 106 is threaded for the entire length of the bolt. In another embodiment the connection bolt 106 is only partially threaded. In one embodiment the connection bolt 106 is threaded through the tube 104. In this embodiment the distance from the fence will be determined by twisting the connection bolt 106. In another embodiment there is at least one nut 304 threaded onto the connection bolt 106. In one embodiment the nut 304 is threaded onto the connection bolt 106 after it is put through the tube 104, to push the fence away from the fence post. In another embodiment the nut 304 is threaded onto the connection bolt 106 before it enters the tube 104, to pull the fence towards the fence post. In yet a further embodiment there is a nut 304 placed on either side of the tube 104 to secure the fence in place.

Figure 4:
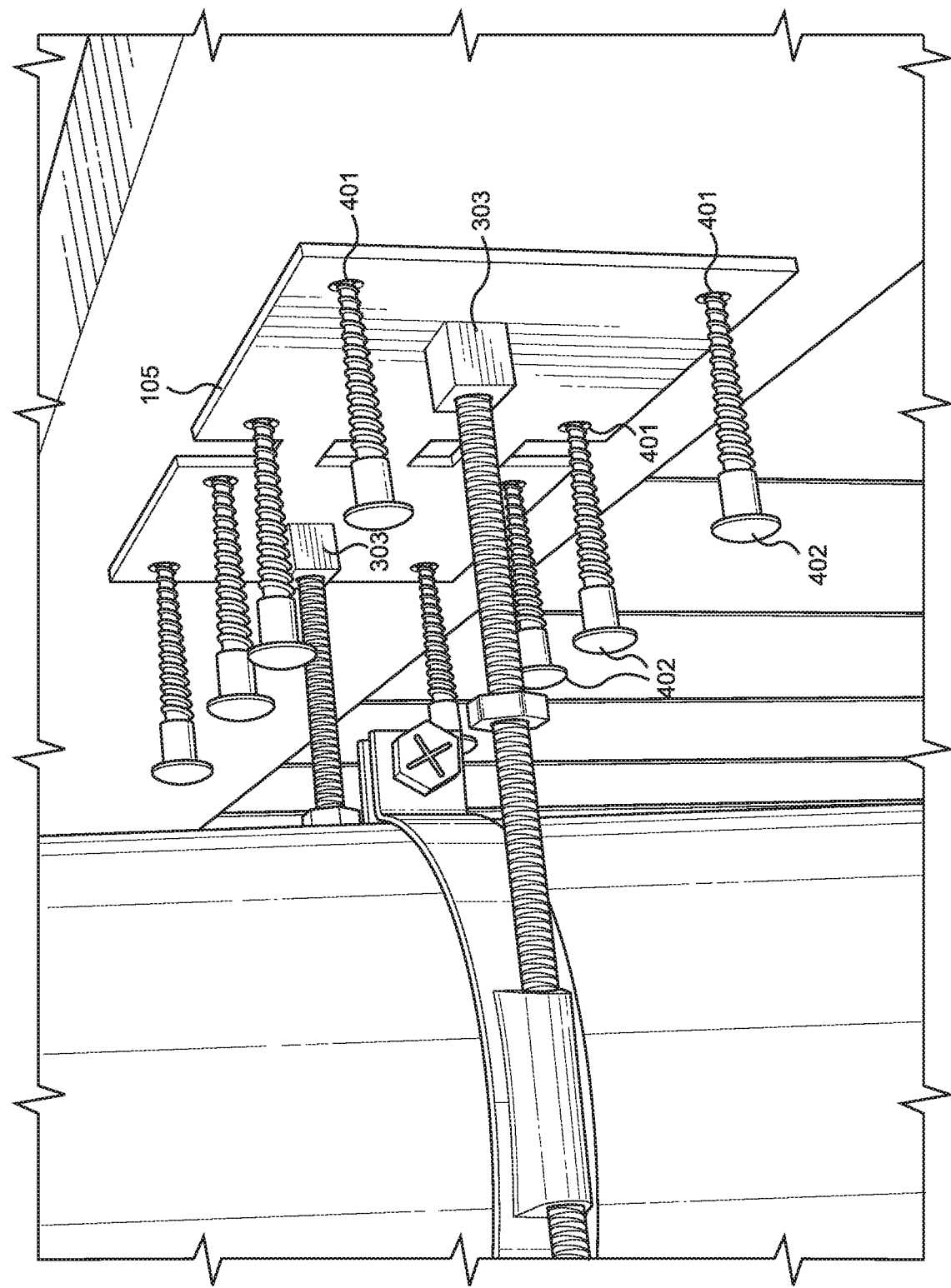
FIG. 4 shows a perspective view of an embodiment of the adjustable fence post coupler base attached to a fence.

Referring now to FIG. 4, there is shown a perspective view of an embodiment of the adjustable fence post coupler base attached to a fence. The fence connection plate 105 may be configured to have various shapes, sizes, and thicknesses. In one embodiment the fence connection plate is rectangular. In another embodiment the fence connection plate 105 is round. In a further embodiment the fence connection plate 105 is made from metal. In yet another embodiment the fence connection plate 105 is made from wood.

In addition to the bolt connectors 303 as described in FIG. 3 the fence connection plate 105 further includes a plurality of apertures 401 therein. The plurality of apertures 401 are configured to accept a connection device 402 through each aperture. In one embodiment the connection device 402 is a screw. In another embodiment the connection device is a nail. In yet another embodiment the connection device is a nut and a bolt. In all of the embodiments the apertures 401 are configured to not allow the head of the securement device 402 to pass through. This will attach the fence connection plate 105 securely to a fence.

Figure 5:
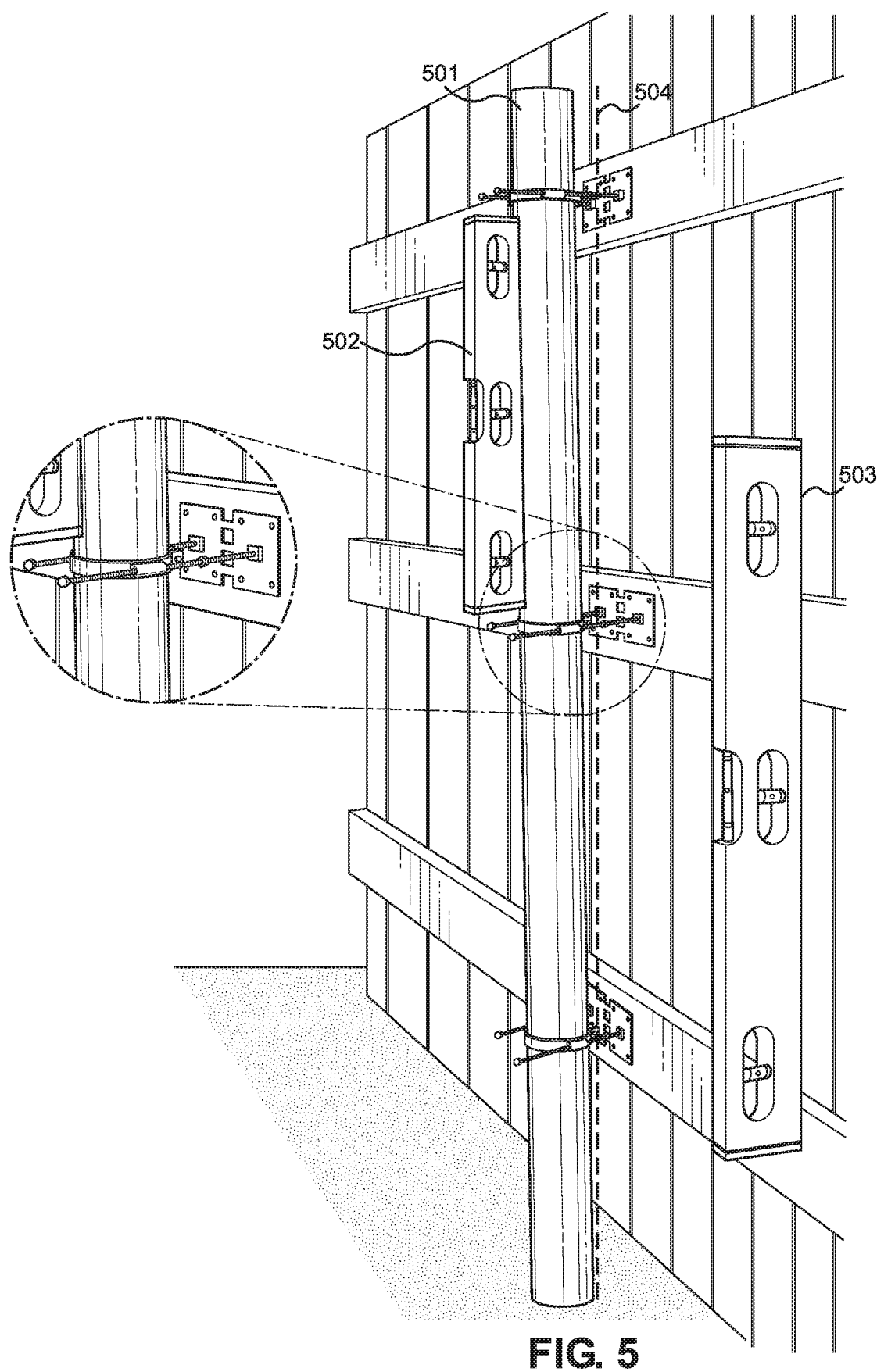
FIG. 5 shows an in-use view of an embodiment of the adjustable fence post coupler.

Referring now to FIG. 5, there is shown an in-use view of an embodiment of the adjustable fence post coupler. In use at least one adjustable fence post coupler is attached to a fence post 501. As shown in FIG. 5 the fence post may not be perfectly straight as shown by the level 502. There is further, a reference line 504 to demonstrate where straight upright is. Each adjustable fence post coupler will then be attached to the fence by the fence connection plate. The connection bolts will then be loosened or tightened as needed to make sure the fence is straight as shown by level 503. The distance between the fence and the fence post may vary among each post and even each adjustable fence post coupler. In the embodiments where the tubes are connection via a swivel connection the connection bolts will tilt to better allow this to happen. This will ensure that even if the fence posts are not straight the fence still will be.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. An adjustable fence post coupler, comprising:
   a fence post connection strap;
   at least one tube is connected to an exterior of the fence post connection strap, wherein the tube is connected to the fence post connection strap with a swivel attachment;
   each tube has a connection bolt located movably through the tube;
   the connection bolt is connected to a fence connection plate.

2. The adjustable fence post coupler of claim 1, wherein the fence post connection strap is a solid, flexible strap.

3. The adjustable fence post coupler of claim 2, wherein the fence post connection strap is circular.

4. The adjustable fence post coupler of claim 2, wherein the fence post connection strap is rectangular.

5. The adjustable fence post coupler of claim 2, further comprising a tightening bolt configured to tighten the fence post connection strap.

6. The adjustable fence post coupler of claim 1, further comprising at least one nut located on each connection bolt.

7. The adjustable fence post coupler of claim 1, further comprising a threaded connection on the fence connection plate, wherein the connection bolts are connected to the fence connection plate via the threaded connection.

8. The adjustable fence post coupler of claim 1, wherein each tube has a pin located on an exterior side thereof;
   wherein the fence post connection strap has at least two apertures located therethrough; and
   wherein the pins are movably secured within the apertures to enable the tubes to swivel.

\* \* \* \* \*